US011243180B2

(12) United States Patent
    Nakama

(10) Patent No.: US 11,243,180 B2
(45) Date of Patent: Feb. 8, 2022

(54) THERMAL CONDUCTIVITY DETECTOR

(71) Applicant: SHIMADZU CORPORATION, Kyoto (JP)

(72) Inventor: Yuji Nakama, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 16 days.

(21) Appl. No.: 16/760,599

(22) PCT Filed: Dec. 19, 2017

(86) PCT No.: PCT/JP2017/045415
    § 371 (c)(1),
    (2) Date: Apr. 30, 2020

(87) PCT Pub. No.: WO2019/123525
    PCT Pub. Date: Jun. 27, 2019

(65) Prior Publication Data
    US 2021/0215626 A1    Jul. 15, 2021

(51) Int. Cl.
    *G01N 25/18*    (2006.01)
    *G01N 30/66*    (2006.01)

(52) U.S. Cl.
    CPC ............. *G01N 25/18* (2013.01); *G01N 30/66* (2013.01)

(58) Field of Classification Search
    USPC .................................. 374/44, 208, 148, 141
    See application file for complete search history.

(56) References Cited

U.S. PATENT DOCUMENTS 4,215,564 A * 8/1980 Lawson .................. G01N 25/18
                                                          73/25.03
6,550,961 B1 * 4/2003 Ueda ...................... G01N 27/18
                                                          374/44
(Continued)

FOREIGN PATENT DOCUMENTS

JP    2002-240582 A    8/2002
JP    2010-073619 A    4/2010
(Continued)

OTHER PUBLICATIONS

Communication dated Nov. 10, 2020, issued by the Japanese Patent Office in application No. 2019-559889.
(Continued)

*Primary Examiner* — Mirellys Jagan
(74) *Attorney, Agent, or Firm* — Sughrue Mion, PLLC

(57) ABSTRACT

Provided is a thermal conductivity detector including a detection channel through which a gas to be measured flows as a fluid, a heat conducting part that includes at least a filament provided at a position in the detection channel at which the filament is in direct contact with the fluid flowing through the detection channel, the filament being folded at least once in a direction substantially parallel to a flow direction of the fluid flowing through the detection channel, and that conducts heat via the fluid flowing through the detection channel, and a detection circuit that detects an electric signal in accordance with a change in current or voltage of the filament. The filament is folded by being holed on a folding pin provided substantially perpendicular to the flow direction in the detection channel, and the folding pin has a position shift prevention structure for preventing a fold of the filament hooked on the folding pin from shifting in a longitudinal direction of the folding pin.

3 Claims, 3 Drawing Sheets

(56) References Cited

U.S. PATENT DOCUMENTS

| | | | |
|---|---|---|---|
| 2004/0136435 A1* | 7/2004 | Gellert | G01N 25/18 |
| | | | 374/44 |
| 2004/0250601 A1* | 12/2004 | Lin | G01N 30/66 |
| | | | 73/25.03 |
| 2010/0072876 A1 | 3/2010 | Nakashima et al. | |
| 2016/0103105 A1* | 4/2016 | Nakama | G01N 25/18 |
| | | | 73/23.4 |
| 2016/0334376 A1* | 11/2016 | Gellert | G01N 30/62 |
| 2020/0088662 A1* | 3/2020 | Takahashi | G01N 25/18 |
| 2020/0300794 A1* | 9/2020 | Takahashi | G01N 27/18 |

FOREIGN PATENT DOCUMENTS

| | | |
|---|---|---|
| JP | 2010-185867 A | 8/2010 |
| JP | 2011-179851 A | 9/2011 |
| WO | 2017/154059 A1 | 9/2017 |

OTHER PUBLICATIONS

International Search Report for PCT/JP2017/045415 dated Mar. 20, 2018 (PCT/ISA/210).
Written Opinion of the International Searching Authority for PCT/JP2014/045415 dated Mar. 20, 2018 (PCT/ISA/2347).

* cited by examiner

THERMAL CONDUCTIVITY DETECTOR

CROSS REFERENCE TO RELATED APPLICATIONS

This application is a National Stage of International Application No. PCT/JP2017/045415 filed Dec. 19, 2017.

TECHNICAL FIELD

The present invention relates to a thermal conductivity detector (TCD).

BACKGROUND ART

As an example, known detectors used for gas chromatography include a thermal conductivity detector. The thermal conductivity detector detects heat conduction from a heating element (filament) to a fluid (gas) flowing around the heating element. After injected into a detection channel containing the filament, the gas is discharged from the detection channel.

Thermal conductivity detectors include a so-called gas switching type (e.g., refer to Patent Document 1). The thermal conductivity detector of this type controls whether a gas (column gas) from a separation column or a reference gas is injected into a detection channel provided with a measurement filament, as a gas to be measured, using a pressure difference caused by changing an inflow place of the reference gas, and obtains a signal of differences in the gas to be measured.

PRIOR ART DOCUMENTS

Patent Documents

Patent Document 1: Japanese Patent Laid-open Publication No. 53-046091
Patent Document 2: International Publication No. WO 2017/154059

SUMMARY OF THE INVENTION

Problems to be Solved by the Invention

Thermal conductivity detectors can improve detection sensitivity by increasing the length of a filament for conducting heat to a fluid, thereby increasing a contact area with the fluid. Patent Document 1 discloses a thermal conductivity detector in which a filament is provided in a linear shape, so that a detection channel in which the filament is disposed needs to be increased in length to lengthen the filament. However, the detection channel is limited in length in accordance with a size of the entire thermal conductivity detector, so that the detection channel may not have a length long enough to dispose a long filament.

When the detection channel is increased in length, it takes a longer time for a gas to be measured to pass through the detection channel. This causes a problem in that chromatograms have wide peak shapes. In addition, a thermal conductivity detector of a gas switching type that switches a gas to be measured flowing in a detection channel between a column gas and a reference gas at regular intervals requires all gases around a filament to be replaced within a predetermined time. For these reasons, the filament has a length limited to about several tens of mm.

To solve the above problem, a filament that is disposed in a detection channel while being folded at an intermediate point in a gas flow direction (refer to Patent Document 2) is proposed. When the filament is disposed in the detection channel while being folded at an intermediate point, the filament can be increased in length without increasing the length of the detection channel. This causes the filament to be long along the gas flow direction, so that heat is less likely to be taken away by forced convection to improve a signal. Accordingly, S/N can be improved without increasing the gas replacement time of gas or increasing the size of a detector.

However, it has been found that S/N may fluctuate or decrease in a detector having a structure in which a filament is folded in a gas flow direction in a detection channel.

Thus, it is an object of the present invention to stabilize S/N of a heat conduction detector having a structure in which a filament is folded in a gas flow direction in a detection channel.

Solutions to the Problems

The structure in which the filament is folded in the gas flow direction in the detection channel can be easily achieved by hooking the filament on a pin erected perpendicular to the gas flow direction in the detection channel and folding back the filament. When using this kind of structure, the present inventors have found that fluctuation or decrease in S/N is caused by a shift in position of a filament hooked on a pin from an initial position due to expansion and contraction of the filament in accordance with temperature rise and fall in a detection channel or vibration of a cell block during measurement. It has also been found that when the filament hooked on the pin shifts in position greatly, the filament may come into contact with a metal wall surface of the detection channel to cause a short circuit at worst.

The present invention is made based on the above findings, and is intended to stabilize S/N by reducing displacement of a position of a filament hooked on a pin due to temperature fluctuation in a detection channel during measurement.

Specifically, a thermal conductivity detector according to the present invention includes a detection channel through which a gas to be measured flows as a fluid, a heat conducting part that includes at least a filament provided at a position in the detection channel at which the filament is in direct contact with the fluid flowing through the detection channel, the filament being folded at least once in a direction substantially parallel to a flow direction of the fluid flowing through the detection channel, and that conducts heat via the fluid flowing through the detection channel, and a detection circuit that detects an electric signal in accordance with a change in current or voltage of the filament. The filament is folded by being hooked on a folding pin provided substantially perpendicular to the flow direction in the detection channel, and the folding pin has a position shift prevention structure for preventing a fold of the filament hooked on the folding pin from shifting in a longitudinal direction of the folding pin.

The position shift prevention structure may include a groove or a protrusion provided on an outer peripheral surface of the folding pin.

The folded pin is made of an insulating material.

Effects of the Invention

In the thermal conductivity detector according to the present invention, the filament is folded by being hooked on the folding pin provided substantially perpendicular to the flow direction in the detection channel, and the folding pin has the position shift prevention structure for preventing the fold of the filament hooked on the folding pin from shifting in the longitudinal direction of the folding pin. Therefore, a position shift of the fold of the filament hooked on the folding pin due to temperature fluctuation in the detection channel or vibration of a cell block is prevented, and fluctuation and decrease in S/N are suppressed.

EMBODIMENT OF THE INVENTION

Hereinafter, an embodiment of the present invention will be described in detail with reference to the drawings.

Figure 1:
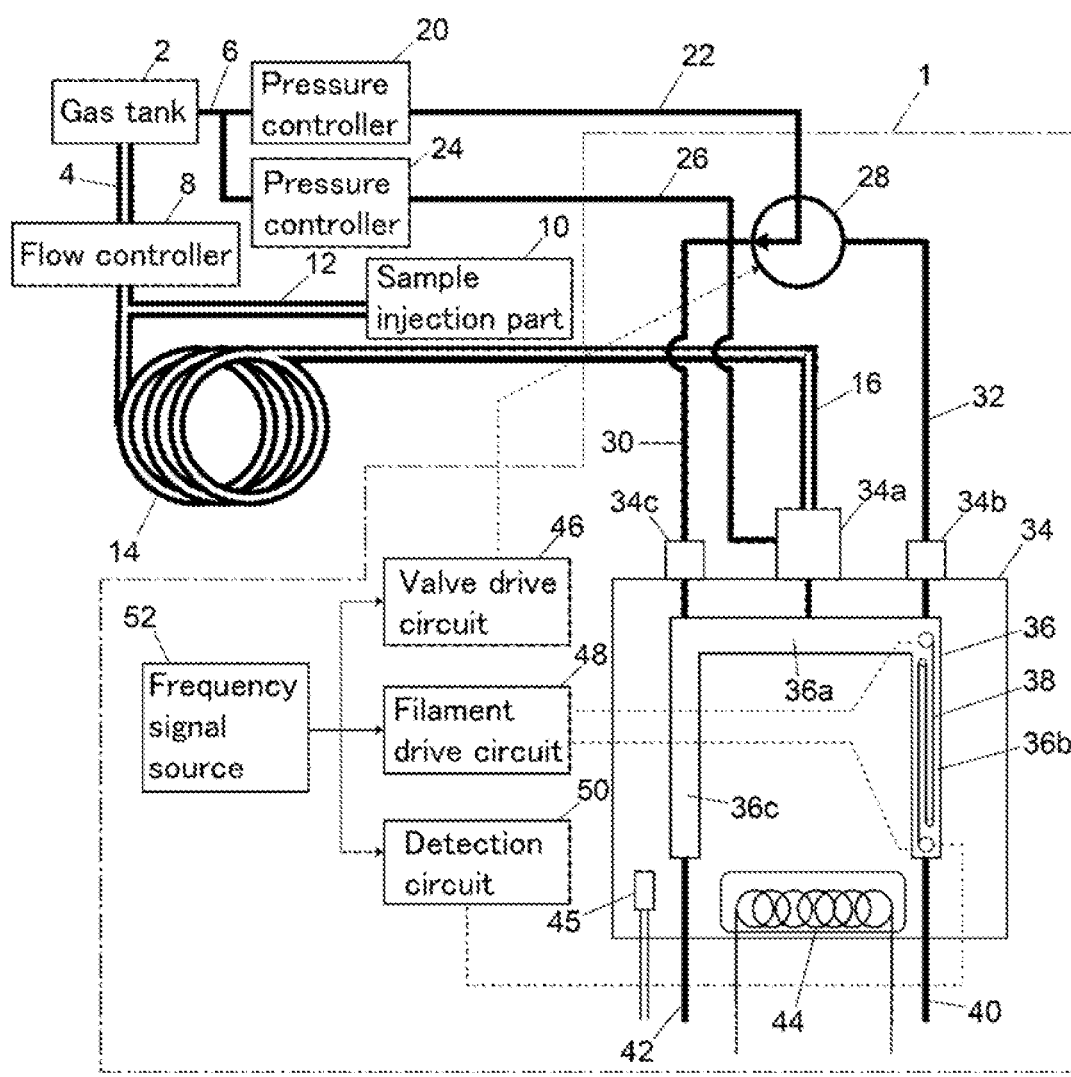
FIG. 1 is a schematic block diagram for illustrating an example of a gas chromatograph provided with a thermal conductivity detector.

An example of a gas chromatograph provided with a thermal conductivity detector will be described with reference to FIG. 1.

In this gas chromatograph, a measurement sample is injected into a sample injection part 10 and heated. The measurement sample is then mixed with a carrier gas supplied from a gas tank 2 through a sample gas channel 12 and adjusted in flow rate by a flow controller 8, so that a column gas is formed. The column gas is injected into a separation column 14 to be separated for each component, and then injected into a thermal conductivity detector 1 through a column gas channel 16.

The gas tank 2 is provided with a channel 6 that branches into a reference gas channel 22 and a makeup gas channel 26. The reference gas channel 22 and the makeup gas channel 26 are provided with pressure controllers 20 and 24, respectively. The reference gas channel 22 and the makeup gas channel 26 are connected to the thermal conductivity detector 1, and a gas from the gas tank 2 is injected into the thermal conductivity detector 1 as a reference gas and a makeup gas.

The thermal conductivity detector 1 includes a switching valve 28, a cell block 34, a valve drive circuit 46, a filament drive circuit 48, a detection circuit 50, and a frequency signal source 52. The cell block 34 is provided inside with a detection channel 36, and includes a heater 44 and a temperature sensor 45 for maintaining a temperature of the cell block 34 at a predetermined temperature that are embedded therein.

The detection channel 36 includes channels 36b and 36c provided substantially parallel to each other, and a channel 36a allowing an end of the channel 36b and an end of the channel 36c to communicate with each other. The channel 36b of the detection channel 36 is provided at a position in direct contact with a fluid with a filament 38 extending in a direction along a flow direction of a gas flowing through the channel 36b. The filament 38 constitutes a heat conducting part that conducts heat to a fluid flowing through the channel 36b of the detection channel 36. The filament 38 is folded back in a direction substantially parallel to a flow direction of the fluid, and has a total length longer than a longitudinal length of the channel 36b.

The cell block 34 includes an inlet port 34a for a column gas and a makeup gas, and inlet ports 34b and 34c for a reference gas. The inlet port 34a communicates with a central portion of the channel 36a. The inlet port 34b communicates with a base end of the channel 36b, and the inlet port 34c communicates with a base end of the channel 36c. The channel 36b is connected at its leading end to a discharge channel 40, and the channel 36c is connected at its leading end to a discharge channel 42.

The inlet port 34a is connected to the column gas channel 16 and the makeup gas channel 26. The inlet ports 34c and 34b are connected to channels 30 and 32, respectively. The channels 30 and 32 are connected to respective ports of the switching valve 28. The switching valve 28 is connected to the reference gas channel 22. The switching valve 28 switches between the channels 30 and 32 through which the reference gas is injected into the detection channel 36.

The column gas from the separation column 14 is injected into the detection channel 36, together with the makeup gas from the makeup gas channel 26, from the central portion of the channel 36a through the inlet port 34a. When the reference gas is injected from the inlet port 34c, the base end of the channel 36c has a higher pressure than the base end of the channel 36b. This causes the column gas injected into the detection channel 36a to flow through the channel 36b. The column gas having flowed through the channel 36b is discharged to the outside through the discharge channel 40.

Conversely, when the reference gas is injected from the inlet port 34b, the base end of the channel 36b has a higher pressure than the base end of the channel 36c. This causes the column gas injected into the detection channel 36a to flow through the channel 36c. The column gas having flowed through the channel 36c is discharged to the outside through the discharge channel 40. At this time, the channel 36b is in a state where only the reference gas flows.

The column gas and the makeup gas injected into the channel 36 through the inlet port 34a have a total flow rate of, for example, 10 ml/min or less, and the reference gas injected into the channel 36 through the inlet port 34b or 34c has a flow rate of 50 ml/min or less, for example. The flow channel 36b has, for example, a width dimension of 1.5 mm or less, and a depth dimension of, for example, 1 mm or less.

The switching valve 28 is switched under control by the valve drive circuit 46. The valve drive circuit 46 switches the switching valve 28 in response to signals at predetermined intervals from the frequency signal source 52.

The filament drive circuit 48 applies voltage to the filament 38. The filament drive circuit 48 controls the voltage applied to the filament 38 to have a constant current flowing through the filament 38 or a constant resistance value of the filament 38.

The detection circuit 50 measures the voltage applied to the filament 38. The detection circuit 50 synchronizes measurement timing in response to a signal of the frequency signal source 52. Accordingly, the voltage of the filament 38 is detected in synchronization with switching timing of the switching valve 28.

Figure 2:
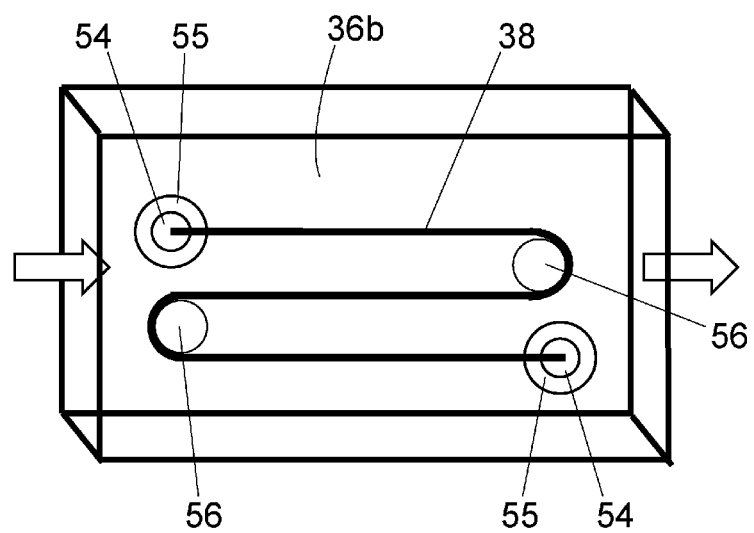
FIG. 2 is a plan view illustrating an example of an installation structure of a filament disposed in a detection channel.
Figure 3:
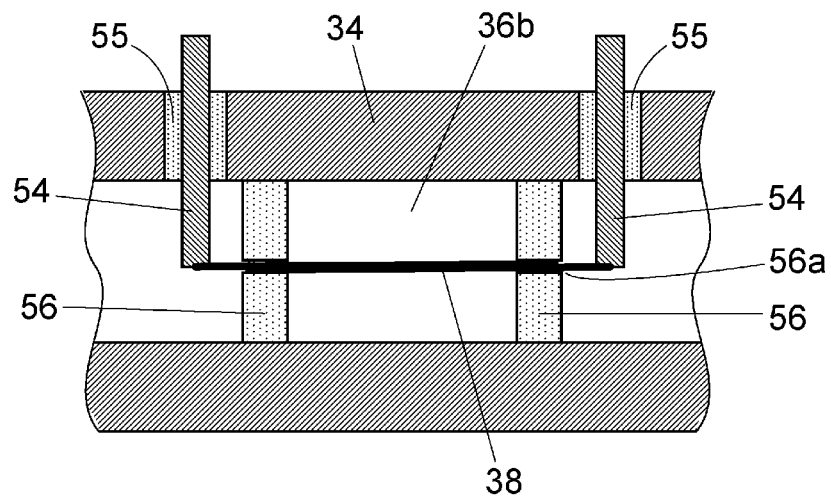
FIG. 3 is a cross-sectional view illustrating an example of a cross-sectional structure of a filament installation portion.

As illustrated in FIGS. 2 and 3, the filament 38 is formed of a single metal wire in the present embodiment. The channel 36b is provided on its upstream and downstream sides each with one conductive pin 54, and a plurality of folding pins 56 made of an insulating material such as ceramic is provided on the upstream and downstream sides of the channel 36b. The filament 38 is folded in the flow direction of the fluid by being hooked on the corresponding one of the folding pins 56, and is fixed at both ends to the corresponding conductive pins 54. The conductive pins 54 are each supported by an insulator 55, without continuity with a housing of the cell block 34. The filament drive circuit 48 and the detection circuit 50 are connected to the corresponding conductive pins 54.

The folding pins 56 are each provided in its outer peripheral surface with a groove 56*a*. The groove 56*a* serves as a position shift prevention structure for preventing a position shift of the filament 38 at a portion hooked on each of the folding pins 56. When this kind of position shift prevention structure is provided in each of the folding pins 56, a position shift of the filament 38 due to temperature rise and fall during measurement is reduced. This enables preventing problems such as fluctuation or decrease in S/N caused by shift in position of the filament 38, and a short circuit due to the filament 38 in contact with a wall surface of the channel 36*b*.

Figure 4:
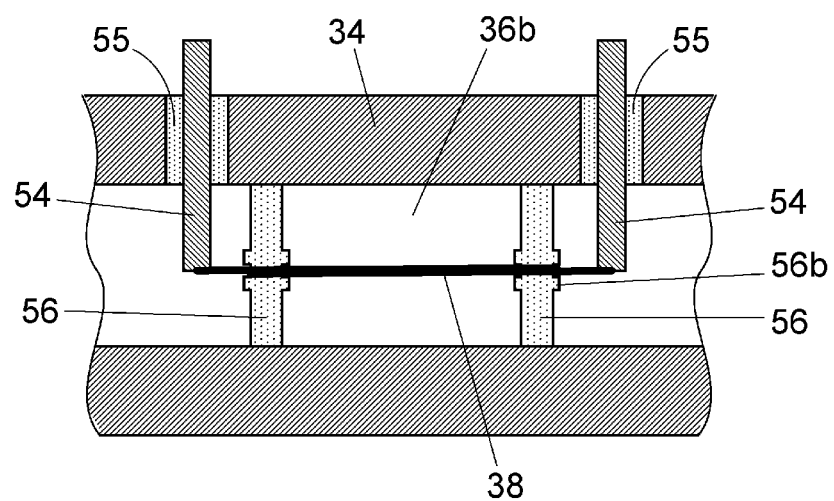
FIG. 4 is a cross-sectional view illustrating another example of a cross-sectional structure of a filament installation portion.

The position shift prevention structure can also be achieved by providing a protrusion 56*b* on the outer peripheral surface of each of the folding pins 56 as illustrated in FIG. 4.

DESCRIPTION OF REFERENCE SIGNS

1: Thermal conductivity detector
28: Switching valve
30, 32: Channel
34: Cell block
34*a*, 34*b*, 34*c*: Inlet port
36: Detection channel
36*a*, 36*b*, 36*c*: Channel (detection channel)
38: Filament
40, 42: Discharge channel
44: Heater
45: Temperature sensor
46: Valve drive circuit
48: Filament drive circuit
50: Detection circuit
52: Frequency signal source

The invention claimed is:

1. A thermal conductivity detector comprising:
 a detection channel through which a gas to be measured flows;
 a heat conducting part that includes at least a filament, the filament being provided in the detection channel at a position at which the filament is to be in direct contact with the gas flowing through the detection channel, and folded at least once in a direction substantially parallel to a flow direction of the fluid flowing through the detection channel, and that conducts heat via the fluid flowing through the detection channel; and
 a detection circuit that detects an electric signal in accordance with a change in current or voltage of the filament, wherein
 the filament is folded by being hooked on a folding pin provided substantially perpendicular to the flow direction in the detection channel, and
 the folding pin has a position shift prevention structure for preventing a fold of the filament hooked on the folding pin from shifting in a longitudinal direction of the folding pin.

2. The thermal conductivity detector according to claim 1, wherein the position shift prevention structure includes a groove or a protrusion provided on an outer peripheral surface of the folding pin.

3. The thermal conductivity detector according to claim 1, wherein the folding pin is made of an insulating material.

* * * * *